United States Patent
Jung et al.

(10) Patent No.: US 9,603,073 B2
(45) Date of Patent: Mar. 21, 2017

(54) METHOD FOR PERFORMING HANDOVER IN WIRELESS COMMUNICATION SYSTEM

(75) Inventors: Sung Hoon Jung, Gyeonggi-do (KR);
Seung June Yi, Gyeonggi-do (KR);
Young Dae Lee, Gyeonggi-do (KR);
Sung Duck Chun, Gyeonggi-do (KR);
Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 13/883,058

(22) PCT Filed: Nov. 4, 2011

(86) PCT No.: PCT/KR2011/008365
§ 371 (c)(1),
(2), (4) Date: May 2, 2013

(87) PCT Pub. No.: WO2012/060655
PCT Pub. Date: May 10, 2012

(65) Prior Publication Data
US 2013/0223409 A1    Aug. 29, 2013

Related U.S. Application Data

(60) Provisional application No. 61/410,854, filed on Nov. 5, 2010.

(51) Int. Cl.
*H04W 36/20*   (2009.01)
*H04W 36/00*   (2009.01)

(52) U.S. Cl.
CPC ....... *H04W 36/20* (2013.01); *H04W 36/0072* (2013.01)

(58) Field of Classification Search
None
See application file for complete search history.

(56) References Cited

U.S. PATENT DOCUMENTS 7,809,373 B2 * 10/2010 Park ................. H04W 74/006
370/338
8,131,295 B2 * 3/2012 Wang ................ H04W 36/0055
370/331

(Continued)

FOREIGN PATENT DOCUMENTS

CN    1805592 A    7/2006
EP    2451214 A1   5/2012

(Continued)

OTHER PUBLICATIONS

Ericsson: Enhanced ICIC for Co-Channel CSG Deployment ; 3GPP Draft; Aug. 19, 2010; col. RAN WG1, no, Madrid, Spain; 20100823.*

(Continued)

*Primary Examiner* — Mounir Moutaouakil
(74) *Attorney, Agent, or Firm* — Morgan, Lewis & Bockius LLP

(57) ABSTRACT

Provided is a method for a user equipment performing a handover in a wireless communication system. The method comprises a step of receiving from a source cell a handover command message, which indicates the handover to a target cell, and a step of performing the handover to the target cell, wherein the handover command message includes information on a low-interference wireless resource to be used by the user equipment inside the target cell. The low-interference wireless resource can be a wireless resource which is operated by the source cell in order to mitigate inter-cell interference, when the source cell is an interfering cell and the target cell is an interfered cell.

20 Claims, 11 Drawing Sheets

(56) References Cited

U.S. PATENT DOCUMENTS

| | | | | |
|---|---|---|---|---|
| 8,565,210 B2* | 10/2013 | Cho | ................. | H04W 52/04 |
| | | | | 370/343 |
| 8,630,653 B2* | 1/2014 | Ahn | ................. | H04L 5/003 |
| | | | | 370/329 |
| 8,743,723 B2* | 6/2014 | Watfa | ................. | H04W 72/1289 |
| | | | | 370/252 |
| 8,811,350 B2* | 8/2014 | Chung | ................. | H04J 11/0093 |
| | | | | 370/280 |
| 8,923,126 B2* | 12/2014 | Wu | ................. | H04W 72/1289 |
| | | | | 370/235 |
| 2009/0124261 A1* | 5/2009 | Shimomura | ................. | H04W 72/082 |
| | | | | 455/436 |
| 2009/0197631 A1 | 8/2009 | Palanki et al. | | |
| 2010/0330998 A1 | 12/2010 | Park et al. | | |
| 2011/0002262 A1* | 1/2011 | Wang | ................. | H04L 1/1812 |
| | | | | 370/328 |
| 2011/0116437 A1* | 5/2011 | Chen | ................. | H04B 7/0689 |
| | | | | 370/312 |
| 2012/0113843 A1* | 5/2012 | Watfa | ................. | H04W 72/1289 |
| | | | | 370/252 |
| 2012/0157082 A1* | 6/2012 | Pedersen | ................. | H04W 24/10 |
| | | | | 455/422.1 |
| 2012/0329464 A1 | 12/2012 | Tanaka | | |
| 2013/0217407 A1* | 8/2013 | Gerlach | ................. | H04W 28/08 |
| | | | | 455/453 |
| 2013/0265866 A1* | 10/2013 | Yi | ................. | H04W 74/0841 |
| | | | | 370/216 |

FOREIGN PATENT DOCUMENTS

| | | |
|---|---|---|
| JP | 2012-505368 A | 3/2012 |
| KR | 10-2007-0046698 A | 5/2007 |
| KR | 10-2010-0087821 A | 8/2010 |
| KR | 10-2010-0108454 A | 10/2010 |
| WO | 2009/099813 A1 | 8/2009 |
| WO | 2010/041584 A1 | 4/2010 |
| WO | 2011/114461 A1 | 9/2011 |

OTHER PUBLICATIONS

NTT DOCOMO, "Views on eICIC Schemes for Re[-10", 3GPP TSG-RAN WG1 62bis, Xian, China, R1-105724, Oct. 11-15, 2010, 9 pages.*

CMCC (Rapporteur), "Summary of the description of candidate eICIC solutions," 3GPP TSG-WG1 Meeting #62, R1-104968, 3rd Generation Partnership Project (3GPP), Aug. 2010.

NTT DOCOMO, "Views on eICIC Schemes for Rel-10," 3GPP TSG RAN WG1 Meeting #62, R1-104942, 3rd Generation Partnership Project (3GPP), Aug. 2010.

Office Action dated Jul. 6, 2015, issued by the German Intellectual Property Office in German Patent Application No. 112011103680.9.

Office Action dated Aug. 11, 2015, issued by the Japanese Intellectual Property Office in Japanese Patent Application No. 2013-537613.

Office Action issued in counterpart Korean Patent Application No. 10-2013-7011190 dated Oct. 22, 2014.

Office Action dated Mar. 9, 2015, issued by the GB Intellectual Property Office in GB Patent Application No. GB1501972.2.

Huawei, HiSilicon, "Random Access Enhancement for HetNet," 3GPP TSG-RAN WG2 Meeting #73bis, R2-112005, 3rd Generation Partnership Project (3GPP), Apr. 2011.

Chinese Office Action dated May 5, 2015, issued by the State Intellectual Property Office of China in Chinese Patent Application No. 201180053456.9.

Aziz et al., "Improvement of LTE Handover Performance through Interference Coordination," Radio Access Domain, Alcatel-Lucent Bell Labs, Stuttgart, Germany, Apr. 29, 2009, pp. 1-5.

Lin et al., "Requirement of Handover Modeling in the Downlink 3GPP Long Term Evolution System," 2010 IEEE 24th International Conference on Advanced Information Networking and Applications Workshops, IEEE computer Society, Apr. 23, 2010, pp. 305-310.

Racz et al., "Handover Performance in 3GPP Long Term Evolution (LTE) Systems," Mobile and Wireless Communication Summit, Jul. 5, 2007.

Office Action issued in counterpart Great Britain Patent Application No. 1308764.8 dated Jul. 22, 2014.

Huawei, HiSilicon, "Analysis on TDM based RLM/RRM/CSI measurement impact," 3GPP TSG-RAN WG2 Meeting #71bis, R2-105600, Oct. 11-15, 2010.

Qualcomm Incorporated, "Initial thought on RAN3 impact from eICIC," 3GPP TSG-RAN WG3 #69bis, R3-103060, Oct. 11-15, 2010.

Office Action issued in counterpart Japanese Patent Application No. 2013-537613 dated Apr. 22, 2014.

Racz et al., "Handover Performance in 3GPP Long Term Evolution (LTE) Systems," Mobile and Wireless Communication Summit, 2007. 16th IST. pp. 1-5, Jul. 1-5, 2007.

Aziz et al., "Improvement of LTE Handover Performance through Interference Coordination," Vehicular Technology Conference, 2009. VTC Spring 2009. IEEE 69th. pp. 1-5, Apr. 26-29, 2009.

Lin et al., "Requirement of Handover Modeling in the Downlink 3GPP Long Term Evolution System." Advanced Information Networking Applications Workshops (WAINA), 2010 IEEE 24th International Conference, pp. 305-310, Apr. 20-23, 2010.

Search Report issued in corresponding International Patent Application No. PCT/KR2011/008365 dated Apr. 26, 2012.

* cited by examiner

METHOD FOR PERFORMING HANDOVER IN WIRELESS COMMUNICATION SYSTEM

TECHNICAL FIELD

The present invention relates to wireless communication and, more particularly, to a handover method based on restrictive measurement using low-interference radio resources in a wireless communication system and an apparatus for supporting the same.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

User Equipment (UE) can be influenced by interference due to radio signals that are transmitted by other cells, while being served within a specific cell. The UE periodically measures a cell and reports a result of the measurement. If the UE handovers to another cell, the UE can measure a neighbor cell as well as a serving cell and report a result of the measurement. If the radio signals of other cells generate interference when measuring a specific cell, it is difficult for the UE to normally measure the specific cell. This leads to the deteriorated mobility of the UE in a wireless communication system.

In particular, if service coverage, the frequency band of a channel used, and Radio Access Technology (RAT) served by a cell are different as in a case where a macro cell, a pico cell, and a femto cell coexist, the importance of a method capable of avoiding interference caused by the cells can be further increased.

Inter-Cell Interference Coordination (ICIC) is a task of operating radio resources so that control of inter-cell interference can be maintained. An ICIC mechanism can be divided into frequency domain ICIC and time domain ICIC. ICIC includes a multi-cell Radio Resource Management (RRM) function in which pieces of information from multiple cells need to be taken into consideration.

The frequency domain ICIC coordinates the use of frequency domain resources (e.g., Resource Blocks (RBs)) between multiple cells. The time domain ICIC coordinates time domain resources (e.g., subframes) between multiple cells.

In ICIC, the object that causes interference (i.e., an interfering cell) and the object that is damaged by interference (i.e., an interfered cell) are determined depending on the object on which UE performs measurement.

When UE accesses the coverage of a neighbor cell to which the UE cannot access, the UE can be subject to great interference. In order to prevent a situation in which UEs unable to access a neighbor cell cannot perform communication due to interference from the neighbor cell, the neighbor cell low-interference radio resources can be configured so that radio signals can be transmitted and received. Furthermore, measurement for the neighbor cell of UE can be subject to interference due to the radio signals of a serving cell. In order to guarantee the normal measurement of the UE for the neighbor cell, the serving cell can configure low-interference radio resources and transmit and receive radio signals.

When measuring a serving cell and a neighbor cell, UE uses low-interference radio resources configured by a cell that causes interference. This can be said to be restrictive measurement. The restrictive measurement refers to the use of a temporal section or a frequency band in which interference is avoided or reduced. The restrictive measurement can guarantee UE normal service from a serving cell to which the UE is now subscribed and can guarantee the UE smooth mobility at need.

If UE can receive service of better quality through measurement, the UE can handover to a neighbor cell. Whether UE subscribed to a source cell which has configured and operated low-interference radio resources will perform handover or not can be determined by a result of restrictive measurement. Meanwhile, the operation of the UE through the low-interference radio resources provided by the source cell may not be applied to service from a target cell during the handover or after the handover. This can deteriorate the QoS of the UE when the handover fails or after the handover. Accordingly, there is a need for a handover method through restrictive measurement that uses low-interference radio resources.

DISCLOSURE

Technical Problem

An object of the present invention is to provide a method of performing handover based on restrictive measurement using low-interference radio resources in a wireless communication system and an apparatus for supporting the same.

Technical Solution

In an aspect, a handover method performed by User Equipment (UE) in a wireless communication system is provided. The method includes receiving a handover command message indicating handover to a target cell from a source cell, and performing the handover with the target cell. The handover command message comprises information on low-interference radio resources to be used by the UE within the target cell.

The low-interference radio resources may be radio resources operated by the source cell in order to reduce inter-cell interference when the source cell is an interfering cell and the target cell is an interfered cell.

The low-interference radio resources may include one or more Almost Blank Subframes (ABSs).

The step of performing the handover may include transmitting a random access preamble, receiving a random access response message in response to the random access preamble, and transmitting a handover confirm message to the target cell.

The step of performing the handover may further include controlling timing at which the random access preamble is transmitted so that the random access response message can be received through the low-interference radio resources.

The receiving the random access response message may include receiving the random access response message through the low-interference radio resources.

The transmitting the random access preamble may include transmitting the random access preamble using the low-interference radio resources.

The handover method may further include the step of initiating measurement of the target cell using the low-interference radio resources after completing the handover.

The source cell may be a macro cell. The target cell may be a pico cell which operates coverage overlapped with coverage of the macro cell.

In another aspect, an apparatus for performing measurement in a wireless communication system is provided. The apparatus includes a Radio Frequency (RF) unit transmitting and receiving radio signals, and a processor connected to the RF unit. The processor is configured to receive a handover command message indicating handover to a target cell from a source cell, and perform the handover with the target cell. the handover command message include information on low-interference radio resources to be used by the UE within the target cell.

The low-interference radio resources may be radio resources operated by the source cell in order to reduce inter-cell interference when the source cell is an interfering cell and the target cell is an interfered cell.

The low-interference radio resources may include one or more Almost Blank Subframes (ABSs).

The performing the handover may include transmitting a random access preamble, receiving a random access response message in response to the random access preamble, and transmitting a handover confirm message to the target cell.

The performing the handover may further include controlling timing at which the random access preamble is transmitted so that the random access response message can be received through the low-interference radio resources.

The receiving the random access response message may include receiving the random access response message through the low-interference radio resources.

The transmitting the random access preamble may include transmitting the random access preamble using the low-interference radio resources.

In still another aspect, a handover method performed by a source cell in a wireless communication system is provided. The method include receiving a result of restrictive measurement from User Equipment (UE), wherein the result of measurement is a result of measurement based on low-interference radio resources configured by a source cell, determining a target cell which is an object of handover based on the result of the restrictive measurement, transmitting a handover request message to the target cell, receiving a handover request acknowledgement (ACK) message in response to the handover request message, and transmitting a handover command message indicating of the handover to the target cell the UE. The handover command message includes information on the low-interference radio resources to be used by the UE within the target cell.

The low-interference radio resources may be sources operated by the source cell in order to reduce inter-cell interference when the source cell is an interfering cell and the target cell is an interfered cell.

The low-interference radio resources may include one or more Almost Blank Subframes (ABSs).

The handover request message may include information indicating that the handover has been triggered by the restrictive measurement.

The handover request message may further include the information on the low-interference radio resources.

The handover ACK message may include at least one of information indicating that the UE uses the low-interference radio resources within the target cell and the information on the low-interference radio resources.

Advantageous Effects

UE can obtain information on low-interference radio resources that are now being operated or will be operated by a target cell. UE can exchange handover messages with a target cell using low-interference radio resources during handover. Accordingly, UE can avoid interference that may be generated by a source cell and can complete handover with a target cell normally.

UE can use low-interference radio resources, configured by a source cell and being a basis for the measurement of a target cell before handover starts, to exchange messages with the target cell or to measure a cell during a handover operation or after handover is completed. Accordingly, UE can receive normal service from a serving cell using low-interference radio resources even after handover and can measure a serving cell and a neighbor cell precisely.

MODE FOR INVENTION

Figure 1:
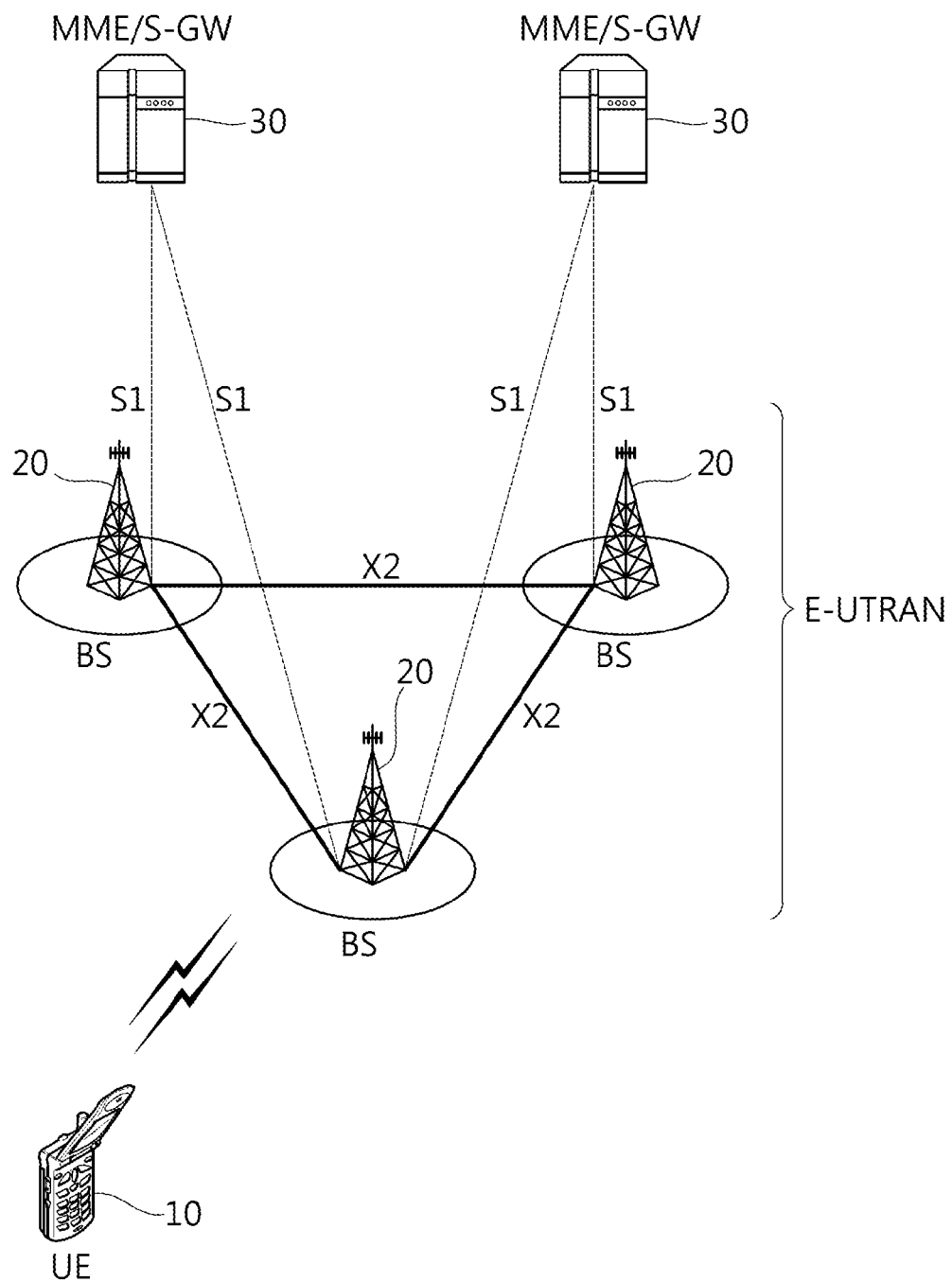
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless apparatus, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
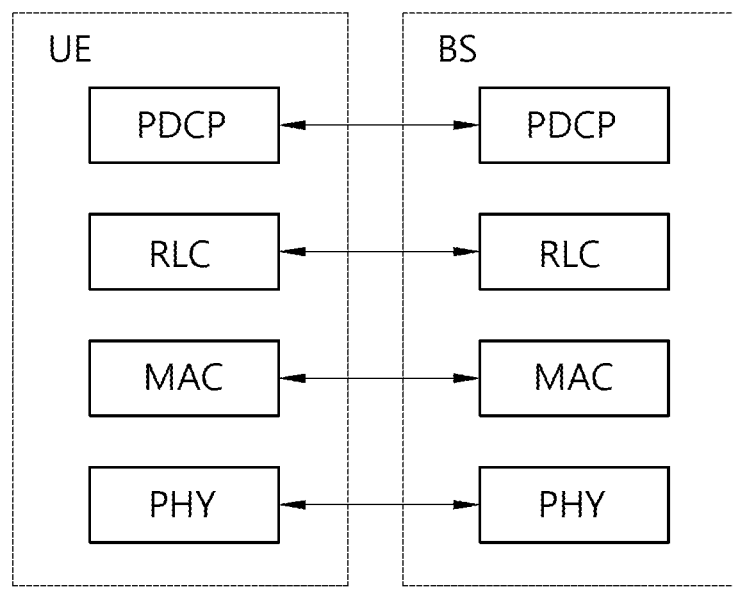
FIG. 2 is a diagram illustrating a radio protocol architecture for a user plane.
Figure 3:
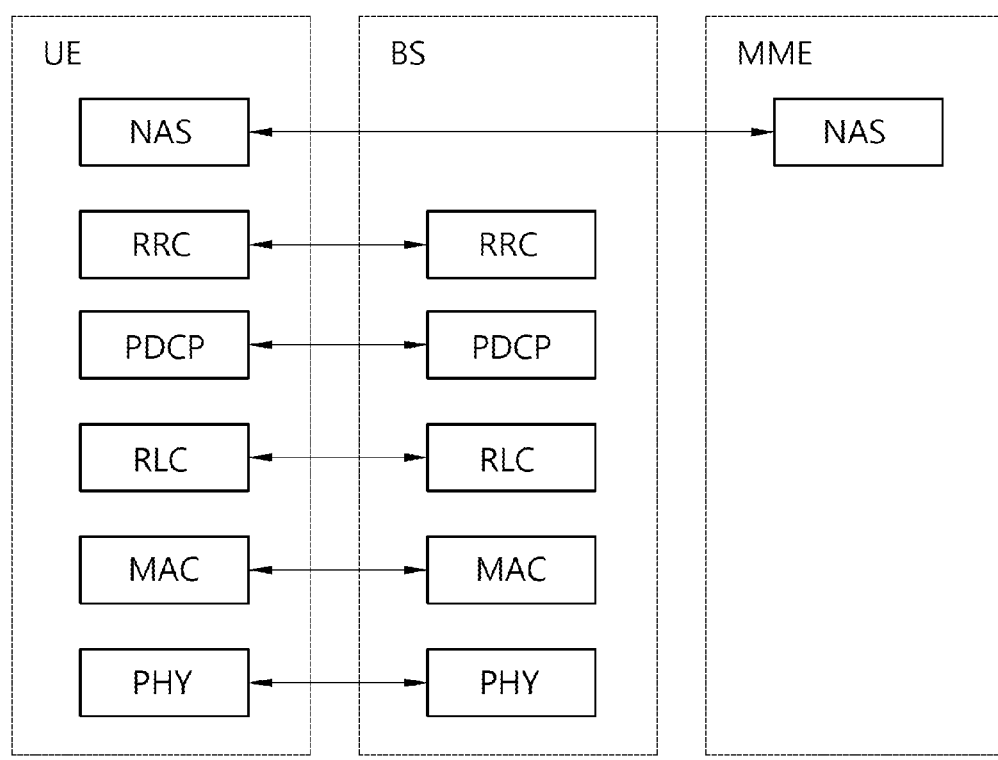
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009 September) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell.

This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.5.0 (2009 March) "User Equipment (UE) procedures in idle mode (Release 8)", a method and procedure for selecting a cell by a UE in 3GPP LTE will be described in detail.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE receives parameters for the cell reselection from the BS.

Second, the UE measures quality of a serving cell and a neighboring cell for a cell reselection.

Third, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_s = Q_{meas,s} + Q_{hyst}, R_n = Q_{meas,n} - Q_{offset}$$ [Math Figure 1]

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qoffset=Qoffsets,n. Otherwise, Qoffset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

A serving cell can be divided into a primary cell and a secondary cell. The primary cell is a cell which operates in a primary frequency and performs an initial connection establishment process with UE or initiates a connection re-establishment process and is a cell designated as a primary cell in a handover process. The primary cell is also called a reference cell. The secondary cell operates in a secondary frequency, and it can be configured after an RRC connection has been set up and can be used to provide additional radio resources. At least one primary cell is always configured, and the secondary cell can be added/modified/released by higher layer signaling (e.g., an RRC message).

A radio link failure is described below.

UE continues to perform measurement in order to maintain the quality of a radio link with a serving cell from which service is received. If the quality of the radio link with the serving cell is deteriorated, the UE determines whether communication with the serving cell is impossible or not. If it is determined that the quality of the serving cell is bad to the extent that the communication with the serving cell is impossible, the UE determines the radio link as a radio link failure.

If it is determined that the radio link is a radio link failure, the UE gives up maintaining current communication with the serving cell, selects a new cell through a cell selection (or cell reselection) procedure, and attempts an RRC connection re-establishment to the new cell.

Figure 4:
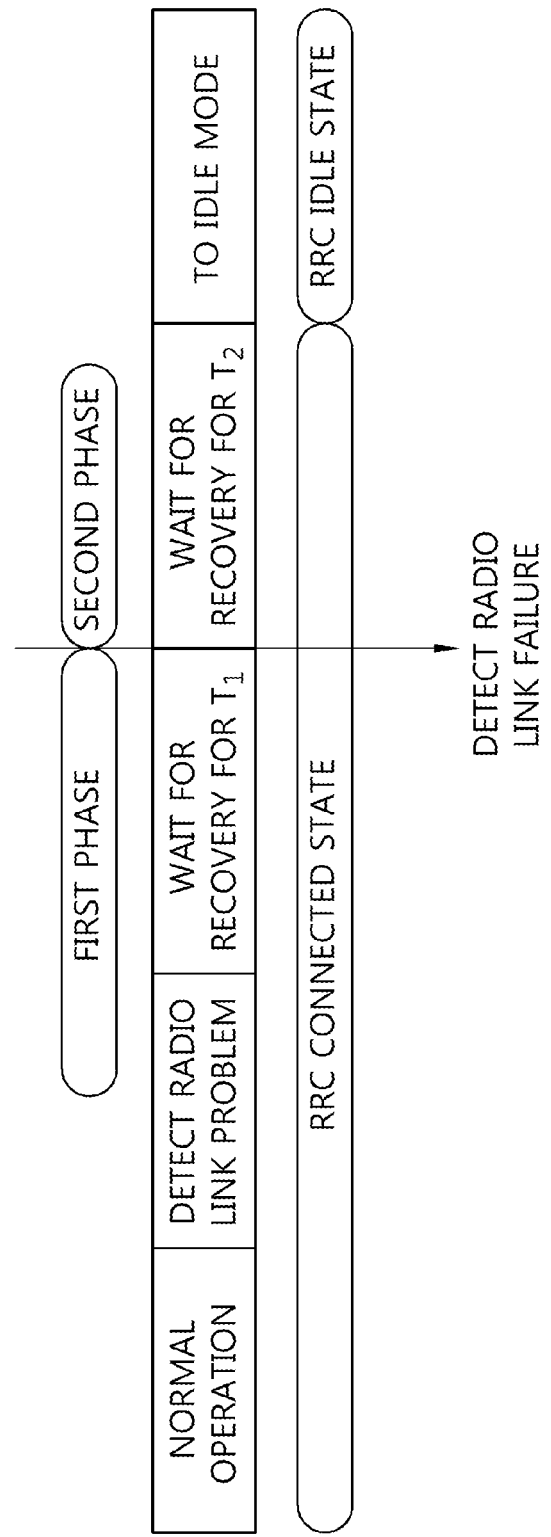
FIG. 4 is an exemplary diagram showing a radio link failure.

FIG. 4 is an exemplary diagram showing a radio link failure. An operation related to a radio link failure can be described in the form of two phases.

In a first phase, UE checks whether a normal operation is performed and whether there is a problem in a current communication link or not.

If a problem is detected, the UE declares a radio link problem and waits for the recovery of the radio link during a first standby time T1. If the radio link is recovered before the first standby time elapses, the UE performs a normal operation again. If the radio link is not recovered until the first standby time expires, the UE declares a radio link failure and enters a second phase.

In the second phase, the UE waits for the recovery of the radio link during a second standby time T2. If the radio link is not recovered until the second standby time elapses, the UE enters an RRC idle state. Or, the UE performs an RRC reconfiguration procedure.

An RRC connection re-establishment procedure is a process of reconfiguring an RRC connection again in an RRC_CONNECTED state. Since the UE remains in the RRC_CONNECTED state, that is, the UE does not enter the RRC_IDLE state, the UE does not reset all its radio setups (e.g., radio bearer configurations). Instead, the UE suspends the use of all the radio bearers except an SRBO when starting the RRC connection re-establishment procedure. If the RRC connection re-establishment is successful, the UE resumes the use of the radio bearers that have been suspended.

Figure 5:
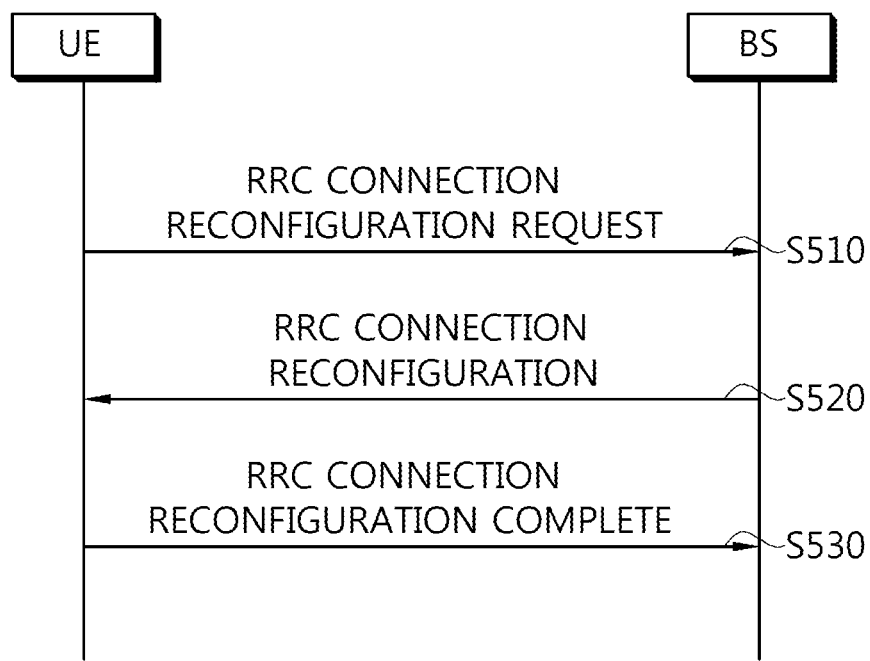
FIG. 5 is a flowchart illustrating a success in a connection re-establishment process.

FIG. 5 is a flowchart illustrating a success in a connection re-establishment process.

UE selects a cell by performing cell selection. The UE receives system information in order to receive basic parameters for cell access from the selected cell. Next, the UE sends an RRC connection re-establishment request message to a BS (S510).

If the selected cell is a cell having the context of the UE, that is, a prepared cell, the BS accepts the RRC connection re-establishment request of the UE and sends an RRC connection re-establishment message to the UE (S520). When the UE sends an RRC connection re-establishment complete message to the BS, the RRC connection re-establishment procedure can be successful (S530).

Figure 6:
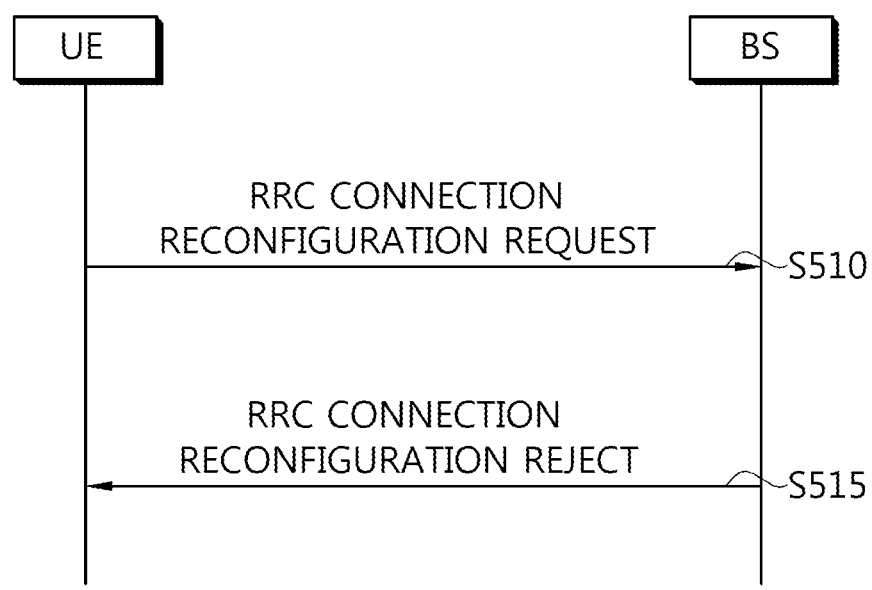
FIG. 6 is a flowchart illustrating a failure of a connection re-establishment process.

FIG. 6 is a flowchart illustrating a failure of a connection re-establishment process. UE sends an RRC connection re-establishment request message to a BS (S510). IF a selected cell is not a prepared cell, the BS sends an RRC connection re-establishment reject message to the UE in response to the RRC connection re-establishment request (S515).

Figure 7:
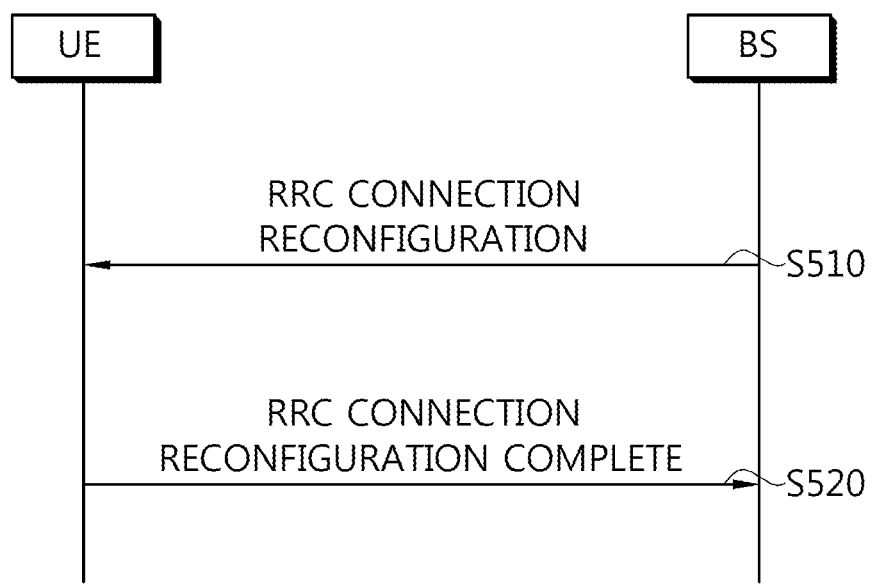
FIG. 7 is a flowchart illustrating an RRC connection reconfiguration process.

FIG. 7 is a flowchart illustrating an RRC connection reconfiguration process. The RRC connection reconfiguration process is used to modify an RRC connection. This is used to establish/modify/release an RB, perform handover, and set up/modify/release measurement.

An RRC connection reconfiguration message for modifying an RRC connection is transmitted to a BS (S710). In response to the RRC connection reconfiguration, the UE sends an RRC connection reconfiguration complete message used to check a successful completion of the RRC connection reconfiguration to a network (S720).

Inter-Cell Interference Coordination (ICIC) is described below.

ICIC is a task of operating radio resources so that control of inter-cell interference can be maintained. An ICIC mechanism can be divided into frequency domain ICIC and time domain ICIC. ICIC includes a multi-cell Radio Resource Management (RRM) function in which pieces of information from multiple cells need to be taken into consideration.

An interfering cell is a cell that provides interference. The interfering cell is also called an aggressor cell.

An interfered cell is a cell that is influenced by interference from an interfering cell. The interfered cell is also called a victim cell.

In the frequency domain ICIC, the use of frequency domain resources (e.g., Resource Blocks (RBs)) between multiple cells is coordinated.

In the time domain ICIC, time domain resources (e.g., subframes) between multiple cells are coordinated. For the time domain ICIC, an Almost Blank Subframe (ABS) pattern may be configured. The ABS is one of low-interference radio resources that have been configured in order to restrict the generation of interference in a neighbor cell due to radio signals that are transmitted by a cell in which an ABS has been configured. The ABS pattern refers to information indicating that what subframe is an ABS within one or more radio frames.

An ABS in an interfering cell is used to protect subframe unit radio resources in an interfered cell that receives strong inter-cell interference. An ABS operates in an interfering cell, and an interfered cell coordinates interference from an interfering cell by utilizing the ABS in scheduling. An ABS is a subframe that has reduced transmission power (or zero transmission power) on a physical channel or reduced activity.

UE is informed of low-interference radio resources, such as an ABS pattern, and thus the measurement of the UE is restricted. This is called measurement resource restriction. In a subframe section configured as an ABS, an interfering cell maintains minimum wireless transmission and reception for maintaining service. In contrast, an interfered UE can perform measurement for a serving cell and a neighbor cell during a corresponding section and can transmit and receive radio signals. In a subframe section not configured as an ABS, an interfering cell performs common radio signal transmission and reception, and UE performs measurement.

There are three types of measurement resource restriction patterns depending on a measured cell (e.g., a serving cell or a neighbor cell) and a measurement type (e.g., Radio Resource Management (RRM), Radio Link Monitoring (RLM), and Channel State Information (CSI)).

An 'ABS pattern 1' is used for RRM/RLM measurement resource restriction of a serving cell. A BS can inform UE of information on the ABS pattern 1 when an RB is configured/modified/released or when MAC/PHY configurations are performed.

An 'ABS pattern 2' is used for the RRM measurement resource restriction of a neighbor cell that operates in the same frequency as a serving cell. Accordingly, in the ABS pattern 2, a list of neighbor cells to be measured, along with pattern information, can be provided to UE. The ABS pattern 2 can be included in a measurement configuration for a measurement object.

An 'ABS pattern 3' is used for resource restriction for the CSI measurement of a serving cell. The ABS pattern 3 can be included in a message that configures a CSI report.

For ICIC, two types: a CSG scenario and a pico scenario are taken into consideration.

Figure 8:
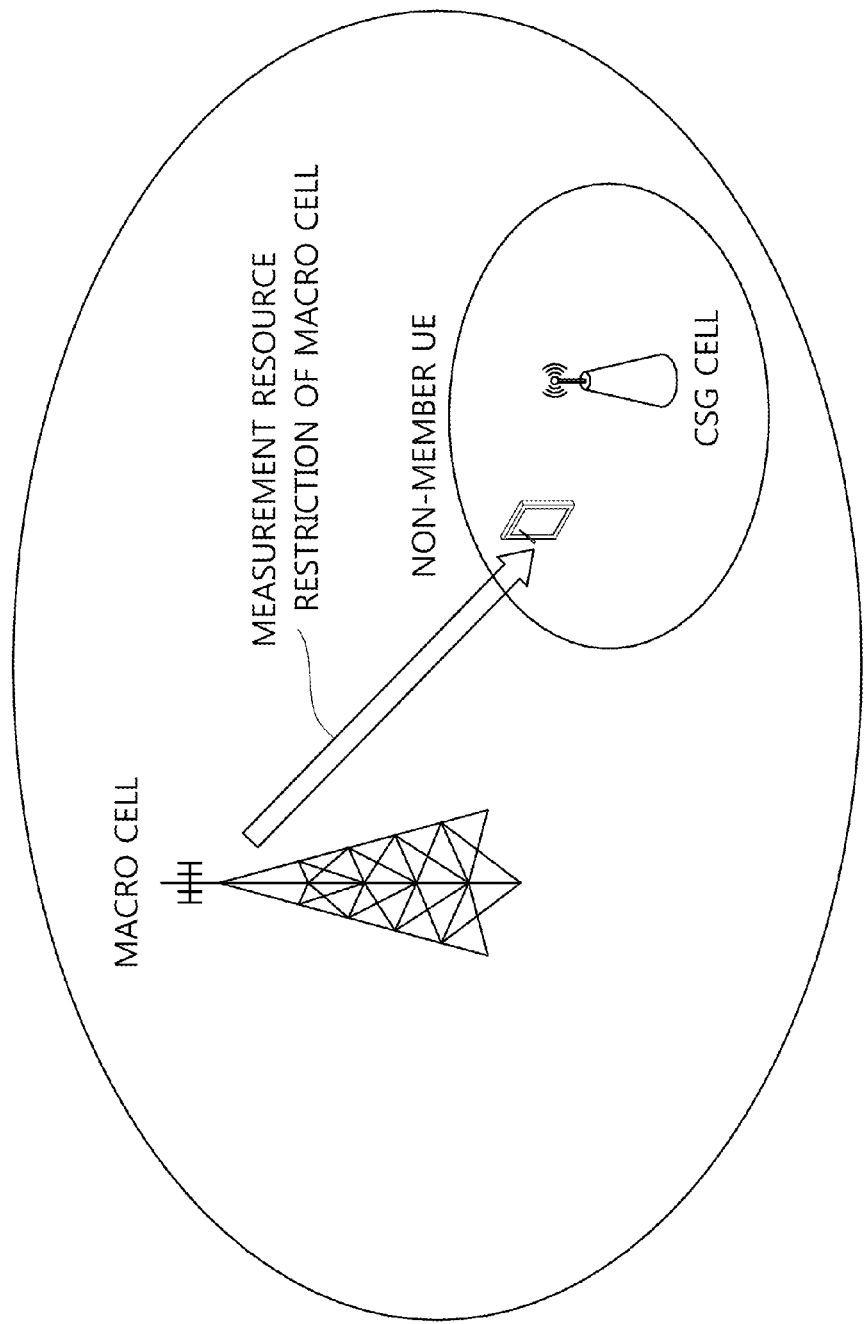
FIG. 8 illustrates the CSG scenario.

FIG. 8 illustrates the CSG scenario.

A CSG cell refers to a cell to which only a specific subscriber can access. A CSG cell may be a home eNB (HeNB). Non-member UE is UE that is not a member of a CSG cell and is UE that cannot access a CSG cell. A CSG cell to which UE cannot access is also called a non-member CSG cell. A macro cell refers to the serving cell of non-member UE. The coverage of a CSG cell and the coverage of a macro cell overlap with each other partially or fully.

A major interference condition is generated when non-member UE is placed near a CSG cell. From a viewpoint of non-member UE, an interfering cell is a CSG cell and a macro cell is an interfered cell. Time domain ICIC is used for non-member UE to continue to receive service from a macro cell.

In an RRC connection state, when a network detects that UE belongs to strong interference from a CSG cell, the network can configure and operate low-interference radio resources. Furthermore, in order to facilitate mobility from a macro cell, a network can configure RRM measurement restriction against a neighbor cell. If UE is no longer greatly influenced by interference from a CSG cell, a network can release RRM/RLM/CSI measurement resource restriction.

A network may not allow a CSG cell to transmit and receive radio signals in a specific period according to configured low-interference radio resources. That is, a CSG cell may not perform the transmission and reception of radio signals for data processing to and from UE within an ABS period.

In the state in which a backhaul connection, such as an X2 interface, is not maintained between a CSG cell and a macro cell, the macro cell may not know information on low-interference radio resources to which the CSG cell has been applied. Accordingly, it is assumed that the information on low-interference radio resources to which a CSG cell has been applied is given from Operations, Administration and Maintenance (OAM). Accordingly, it is also assumed that a macro cell can also know the information on low-interference radio resources.

For RRM, RLM, and CSI measurements, measurement resource restriction based on low-interference radio resources may be applied to UE. That is, restrictive measurement in which RRM, RLM, and CSI measurements are performed can be performed within an ABS period.

A macro cell can provide service to member UE using low-interference radio resources according to the low-interference radio resource configuration of a CSG cell. The UE can exchange messages with a macro cell using the low-interference radio resources.

Figure 9:
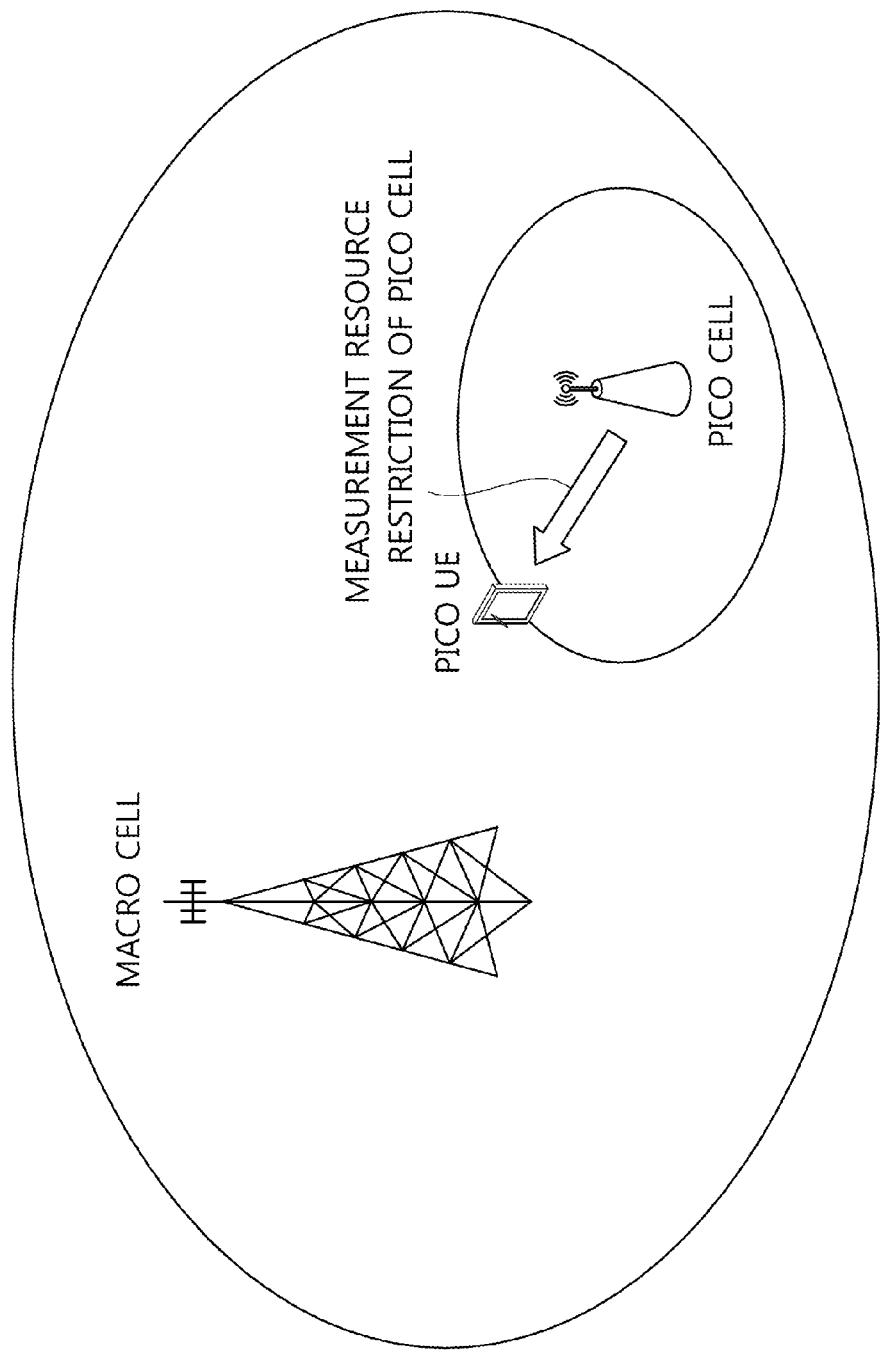
FIG. 9 illustrates a pico scenario.

FIG. 9 illustrates a pico scenario.

A pico cell is the serving cell of pico UE. A pico cell is a cell whose coverage overlaps with that of a macro cell partially or fully. In general, a pico cell may have smaller coverage than a macro cell, but not necessarily limited thereto.

A major interference condition occurs when pico UE is placed at the edge of a pico serving cell. From a viewpoint of pico UE, an interfering cell is a macro cell and a pico cell is an interfered cell. Time domain ICIC is used so that pico UE continues to receive service from a pico cell.

In the pico scenario, time domain ICIC can be initiated by the low-interference radio resource configuration of a macro cell. A macro cell may configure low-interference radio resources, when the macro cell determines that a neighbor cell, such as a pico cell, is placed within its coverage and/or at a neighbor place and that interference can occur. The necessity of the low-interference radio resource configuration can be checked based on a result of the measurement of UE. A macro cell can provide criterion information on which UE determines whether a low-interference radio resource configuration is necessary or not. The UE determines whether the low-interference radio resource configuration is necessary or not based on the criterion information. The criterion information can include information on a threshold for the measurement of the UE and information on the position restriction of the UE.

When information on low-interference radio resources is received from a macro cell, UE can perform restrictive measurement based on the information on low-interference radio resources. The UE performs measurement for a macro cell and a neighbor cell including a pico cell only within a specific period, but may not perform radio signals in other sections. The specific period may be a section that is specified by an ABS pattern.

A macro cell can restrict common service based on low-interference radio resources and can transmit and receive minimum radio signals for maintaining service.

If a pico cell detects that pico UE belongs to strong interference from a macro cell, the pico cell can configure and operate low-interference radio resources. Measurement resource restriction configured by a pico cell is based on low-interference radio resources configured by a macro cell. A macro cell and a pico cell exchange pieces of information through a backhaul, such as an X2 interface. Accordingly, the pico cell can obtain information on low-interference radio resources configured by the macro cell and thus low-interference radio resources can be configured in the pico cell.

Pico UE can perform restrictive measurement based on low-interference radio resources for the purpose of RRM, RLM, and CSI measurements. That is, when a pico cell is subject to strong interference from a macro cell, if RRM/RLM/CSI measurements are performed within an ABS period, more precise measurement is possible. If UE using a macro cell as a serving cell performs measurement for a neighbor cell in an ABS, the mobility of the UE from the macro cell to a pico cell can be easily performed.

A pico cell can provide service to UE using low-interference radio resources. A pico cell can provide normal service to UE within an ABS period and transmit and receive minimum radio signals for maintaining service in periods other than the ABS period.

In configuring low-interference radio resources, more UEs may be served from a pico cell within more ABS periods. In contrast, since the capacity of a macro cell is reduced, an optimized ABS pattern configuration may become an issue.

The above-described ICIC scheme can also be applied to handover, that is, a protocol related to the mobility of UE. UE can perform measurement through low-interference radio resources when performing measurement for handover.

Meanwhile, in a wireless communication system to which ICIC has been applied, when UE attempts handover (HO) to a target cell that experiences interference from a source cell, the handover may fail due to the deteriorated channel quality of the target cell as in interference with the target cell or a quality of service of the UE may be subsequently deteriorated although the handover is successful.

In the case where UE reports a result of measurement for specific low-interference radio resources regarding the interference of a source cell and has performed handover accordingly when measuring a target cell, if the UE does not use or cannot use the low-interference radio resources during or after the handover, the handover may fail or the quality of service of the UE may be subsequently deteriorated although the handover succeeds. In order to solve this problem, there is proposed a handover method accompanied by signaling regarding information on low-interference radio resources.

Figure 10:
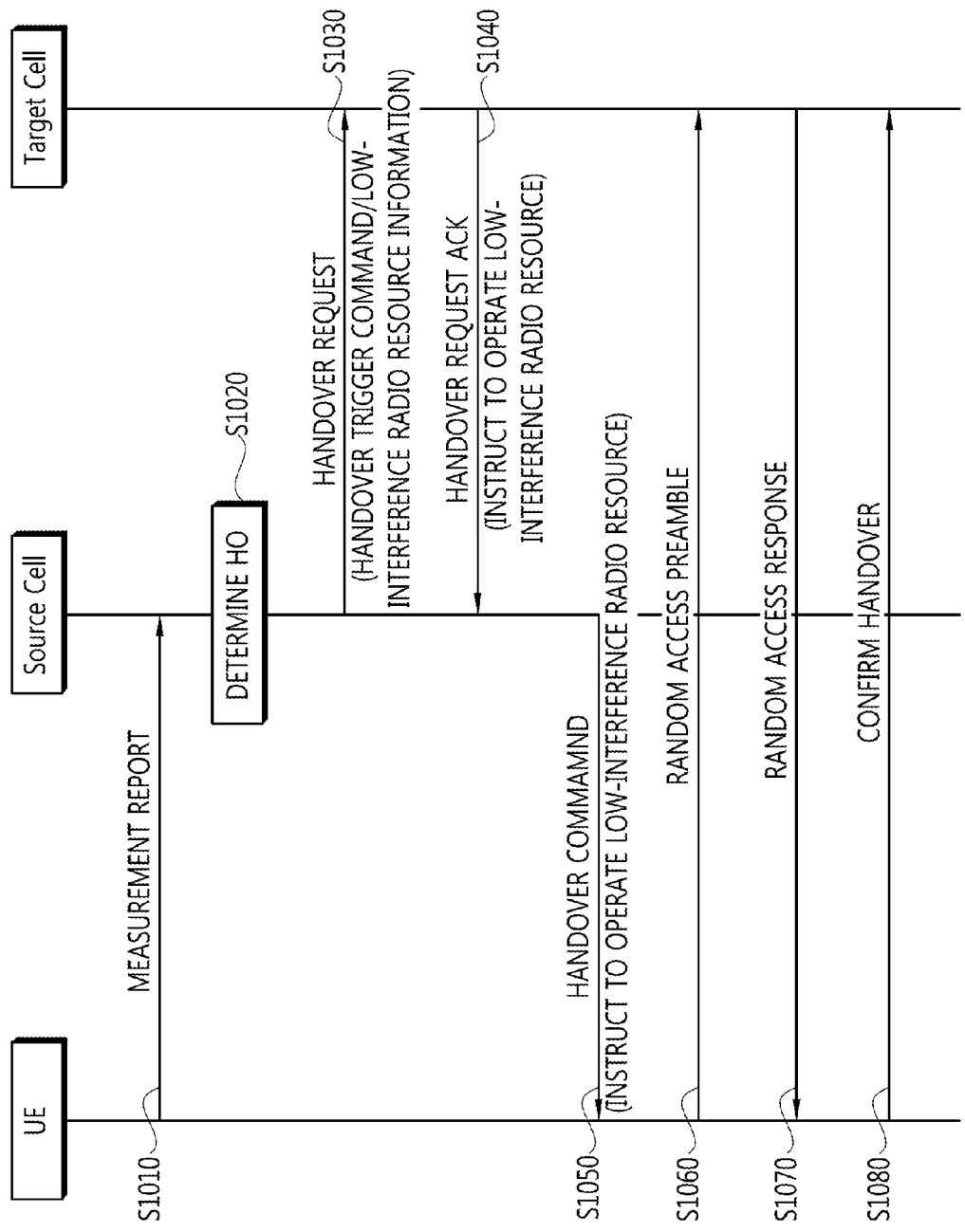
FIG. 10 is a flowchart illustrating a handover method in accordance with an embodiment of the present invention.

FIG. 10 is a flowchart illustrating a handover method in accordance with an embodiment of the present invention.

Referring to FIG. 10, UE sends a measurement report to a source cell to which the UE belongs (S1010). A result of measurement within the measurement report has been performed based on low-interference radio resources configured by a source cell. The result of the measurement is called restrictive measurement. The measurement report can include information on low-interference radio resources that is a basis for the restrictive measurement.

The source cell receives the restrictive measurement from the UE and determines whether handover will be performed based on the restrictive measurement (S1020). When determining whether handover will be performed, the source cell can determine a target cell, that is, the object of handover of the UE.

The source cell sends a handover request message to the target cell (S1030). The handover request message includes information on the restrictive measurement and information on low-interference radio resources.

The information on restrictive measurement can include the restrictive measurement performed by the UE and information indicating that quality can be better when service is received only using low-interference radio resources in the target cell than when service is not received using low-interference radio resources in the target cell. The information on restrictive measurement can further include information indicating that the handover has been triggered based on the restrictive measurement.

The information on low-interference radio resources can include information on the configuration of the low-interference radio resources and information on a cell in which the low-interference radio resources has been configured. The low-interference radio resources can be specified by an ABS pattern. The information on a cell in which the low-interference radio resources have been configured can be information indicating that the low-interference radio resources have been configured has been configured by the source cell.

The target cell that has received the handover request message sends a handover acknowledgement (ACK) message to the source cell (S1040).

The handover ACK message can include information indicating that the UE that will perform the handover operates using the low-interference radio resources within the target cell. The handover ACK message can include the information on low-interference radio resources that will be used by the UE within the target cell. The low-interference radio resources may be information on low-interference radio resources that is included in the handover request message and transmitted from the source cell to the target cell. The low-interference radio resources can be specified by an ABS pattern.

The source cell sends a handover command message to the UE (S1050). The handover command message can include the information included in the handover request ACK message. The handover command message can include information indicating that the UE must perform an operation using the low-interference radio resources.

When receiving the information indicating that the low-interference radio resource operation included in the handover command message, the UE can immediately perform cell measurement using the low-interference radio resources. The UE can perform cell measurement using the low-interference radio resources right after receiving the handover command message or right after the handover is successful. The UE can use the low-interference radio resources when sending an uplink message to the target cell. In sending a random access preamble, the UE can control timing at which the random access preamble is transmitted so that a response message to the random access preamble is received in the low-interference radio resources.

After receiving the handover command message from the source cell, the UE obtains downlink synchronization with the target BS and sends a random access preamble to the target cell (S1060). Here, if a dedicated random access preamble has been allocated in the handover command message, the UE can perform a contention-free random access procedure.

The target cell sends a random access response message, including uplink radio resource allocation information and time offset information, to the UE (S1070). The random access response message can be transmitted through a Downlink-Shared Channel (DL-SCH). The random access response message can further include a Cell-Radio Network Temporary Identifier (C-RNTI). If the target cell has configured low-interference radio resources and is operating the low-interference radio resources, information on the low-interference radio resources of the target cell can be included the random access response message and the random access response message can be then transmitted.

If the random access of the UE to the target cell is successful, the UE sends a handover confirm message, including an uplink buffer status report message, to the target cell (S1080).

The UE that has completed the handover with the target cell can operate using the information on low-interference radio resources included in the handover command message or the random access response message. The UE can perform downlink reception and downlink quality measurement/monitoring using the low-interference radio resources. The UE can receive the signal of the target cell that is transmitted within an ABS period and perform measurement for its serving cell and neighbor cell within the ABS period.

In the handover method in accordance with an embodiment of the present invention, information on low-interference radio resources which are being operated or will be operated by a target cell is included in a handover message, and the handover message is transmitted to UE. When the UE receives the information on low-interference radio resources while performing handover, the UE can exchange handover messages with a target cell using the information on low-interference radio resources. Accordingly, the UE can avoid interference that may be generated by a source cell when exchanging the handover messages and can normally complete the handover.

Furthermore, UE can use low-interference radio resources configured by a source cell, that is, a basis for the measurement of a target cell before handover starts, to exchange messages with the target cell during the handover or after the handover is completed or to perform cell measurement. Accordingly, even after the handover, the UE can receive normal service from a serving cell using the low-interference radio resources and can perform precise measurement for the serving cell and a neighbor cell.

Figure 11:
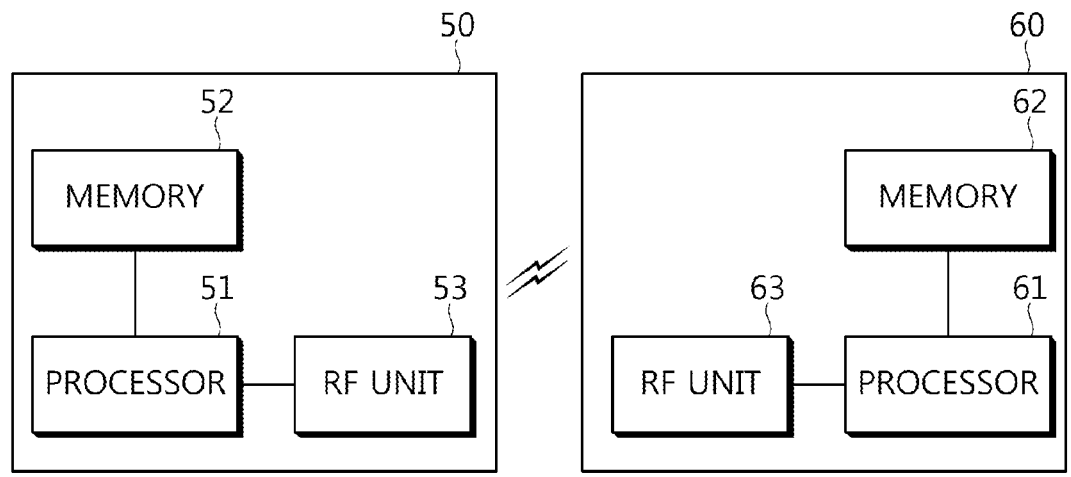
FIG. 11 is a block diagram showing a wireless communication system in which the embodiment of the present invention is embodied.

FIG. 11 is a block diagram showing a wireless communication system in which the embodiment of the present invention is embodied.

A BS 50 includes a processor 51, memory 52, and a Radio Frequency (RF) unit 53. The memory 52 is connected to the processor 51, and it stores various pieces of information for driving the processor 51. The RF unit 53 is connected to the processor 51, and it transmits and/or receives radio signals. The processor 51 embodies the proposed functions, processes and/or methods. The operation of the BS 50 that configures a cell in the embodiment of FIG. 10 can be embodied by the processor 51.

UE 60 includes a processor 61, memory 62, and an RF unit 63. The memory 62 is connected to the processor 61, and it stores various pieces of information for driving the processor 61. The RF unit 63 is connected to the processor 61, and it transmits and/or receives radio signals. The processor 61 embodies the proposed functions, processes and/or methods. In the embodiment of FIG. 10, the operation of the UE 60 can be embodied by the processor 61.

The processor may include Application-Specific Integrated Circuits (ASICs), other chipsets, logic circuits and/or data processors. The memory may include Read-Only Memory (ROM), Random Access Memory (RAM), flash memory, memory cards, storage media and/or other storage devices. The RF unit may include a baseband circuit for processing radio signals. When the above-described embodiment is embodied in software, the above-described scheme may be embodied into a module (process or function) configured to perform the above function. The module may be stored in the memory and executed by the processor. The memory may be placed inside or outside the processor and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A handover method performed by User Equipment (UE) in a wireless communication system, the method comprising:
    receiving a handover command message indicating handover to a target cell from a source cell, and
    performing the handover with the target cell,
    wherein the handover command message comprises information regarding one of a plurality of patterns based on almost blank subframes (ABSs) to be used for measurements by the UE,
    wherein the ABSs are used to reduce inter-cell interferences in a time domain,
    wherein the measurements are restricted to be performed at the subframes indicated by the information regarding patterns based on the ABSs, and
    wherein the plurality of patterns includes three types of patterns, including:
        a first type of pattern to be used for a serving cell for:
            radio resource management (RRM), or
            radio link monitoring (RLM) measurement,
        a second type of pattern to be used for RRM measurement for neighboring cells operating in a same carrier frequency as the serving cell, and
        a third type of pattern to be used for channel state information (CSI) measurement of the serving cell.

2. The handover method of claim 1, wherein the ABSs are operated by the source cell to reduce inter-cell interference when the source cell is an interfering cell and the target cell is an interfered cell.

3. The handover method of claim 1, wherein the performing the handover comprises:
    transmitting a physical random access channel (PRACH);
    receiving a random access response message in response to the transmission; and
    transmitting a handover confirm message to the target cell.

4. The handover method of claim 3, wherein the performing the handover further comprises controlling timing at which the PRACH is transmitted so that the random access response message can be received on at least one of the ABSs.

5. The handover method of claim 4, wherein the receiving the random access response message comprises receiving the random access response message on at least one of the ABSs.

6. The handover method of claim 5, wherein the transmitting the PRACH comprises transmitting the PRACH on at least one of the ABSs.

7. The handover method of claim 6, further comprising initiating measurement of the target cell on at least one of the ABSs after completing the handover.

8. The handover method of claim 7, wherein:
    the source cell is a macro cell; and
    the target cell is a pico cell which operates coverage overlapped with coverage of the macro cell.

9. An apparatus for performing measurement in a wireless communication system, comprising:
    a Radio Frequency (RF) unit transmitting and receiving radio signals; and
    a processor connected to the RF unit, the processor being configured to:
        receive a handover command message indicating handover to a target cell from a source cell; and perform the handover with the target cell, and
wherein the handover command message comprises information regarding one of a plurality of patterns based on almost blank subframes (ABSs) to be used for measurements by the apparatus,
wherein the ABSs are used to reduce inter-cell interferences in a time domain,
wherein the measurements are restricted to be performed at the subframes indicated by the information regarding patterns based on the ABSs, and
wherein the plurality of patterns includes three types of patterns, including:
a first type of pattern to be used for a serving cell for:
radio resource management (RRM), or
radio link monitoring (RLM) measurement,
a second type of pattern to be used for RRM measurement for neighboring cells operating in a same carrier frequency as the serving cell, and
a third type of pattern to be used for channel state information (CSI) measurement of the serving cell.

10. The apparatus of claim 9, wherein the ABSs are operated by the source cell to reduce inter-cell interference when the source cell is an interfering cell and the target cell is an interfered cell.

11. The apparatus of claim 9, wherein the performing the handover comprises:
transmitting a physical random access channel (PRACH);
receiving a random access response message in response to the transmission; and
transmitting a handover confirm message to the target cell.

12. The apparatus of claim 11, wherein the performing the handover further comprises controlling timing at which the PRACH is transmitted so that the random access response message can be received on at least one of the ABSs.

13. The apparatus of claim 12, wherein the receiving the random access response message comprises receiving the random access response message on at least one of the ABSs.

14. The apparatus of claim 13, wherein the transmitting the PRACH comprises transmitting the PRACH on at least one of the ABSs.

15. A handover method performed by a source cell in a wireless communication system, the method comprising:
determining whether a neighbor cell corresponds to a target cell for handover;
transmitting a handover request message to the target cell;
receiving a handover request acknowledgement (ACK) message in response to the handover request message; and
transmitting, to a user equipment (UE), a handover command message indicating the handover toward the target cell,
wherein the handover command message comprises information regarding one of a plurality of patterns based on almost blank subframes (ABSs) to be used for measurements by the UE,
wherein the ABSs are used to reduce inter-cell interferences in a time domain,
wherein the measurements are restricted to be performed at the subframes indicated by the information regarding patterns based on the ABSs, and
wherein the plurality of patterns includes three types of patterns, including:
a first type of pattern to be used for a serving cell for:
radio resource management (RRM), or
radio link monitoring (RLM) measurement,
a second type of pattern to be used for RRM measurement for neighboring cells operating in a same carrier frequency as the serving cell, and
a third type of pattern to be used for channel state information (CSI) measurement of the serving cell.

16. The handover method of claim 15, wherein the ABSs are operated by the source cell to reduce inter-cell interference when the source cell is an interfering cell and the target cell is an interfered cell.

17. The handover method of claim 15, wherein the handover request message further comprises the information regarding patterns of ABSs.

18. The handover method of claim 15, wherein the handover request ACK message comprises information regarding the ABSs.

19. A method for performing a handover procedure in a wireless communication system, the method performed by a source cell, the method comprising:
transmitting, by the source cell, a handover request message to a target cell,
wherein the handover request message comprises information regarding one of a plurality of patterns based on Almost Blank Subframes (ABSs) to be used for measurements by a user equipment (UE),
wherein the ABSs are used to reduce inter-cell interferences in a time domain,
wherein the measurements by the UE are restricted to be performed at the subframes indicated by the information regarding patterns based on the ABSs, and
wherein the plurality of patterns includes three types of patterns, including:
a first type of pattern to be used for a serving cell for:
radio resource management (RRM), or
radio link monitoring (RLM) measurement,
a second type of pattern to be used for RRM measurement for neighboring cells operating in a same carrier frequency as the serving cell, and
a third type of pattern to be used for channel state information (CSI) measurement of the serving cell.

20. A base station for performing a handover procedure in a wireless communication system, comprising:
a transceiver configured to transmit a handover request message to a target base station,
wherein the handover request message comprises information regarding one of a plurality of patterns based on Almost Blank Subframes (ABSs) to be used for measurements by a user equipment (UE),
wherein the ABSs are used to reduce inter-cell interferences in a time domain,
wherein the measurements by the UE are restricted to be performed at the subframes indicated by the information regarding patterns based on the ABSs, and
wherein the plurality of patterns includes three types of patterns, including:
a first type of pattern to be used for a serving cell for:
radio resource management (RRM), or
radio link monitoring (RLM) measurement,
a second type of pattern to be used for RRM measurement for neighboring cells operating in a same carrier frequency as the serving cell, and
a third type of pattern to be used for channel state information (CSI) measurement of the serving cell.

* * * * *